Sept. 15, 1931. M. TIBBETTS 1,823,712
SHOCK ABSORBER
Filed Dec. 30, 1927
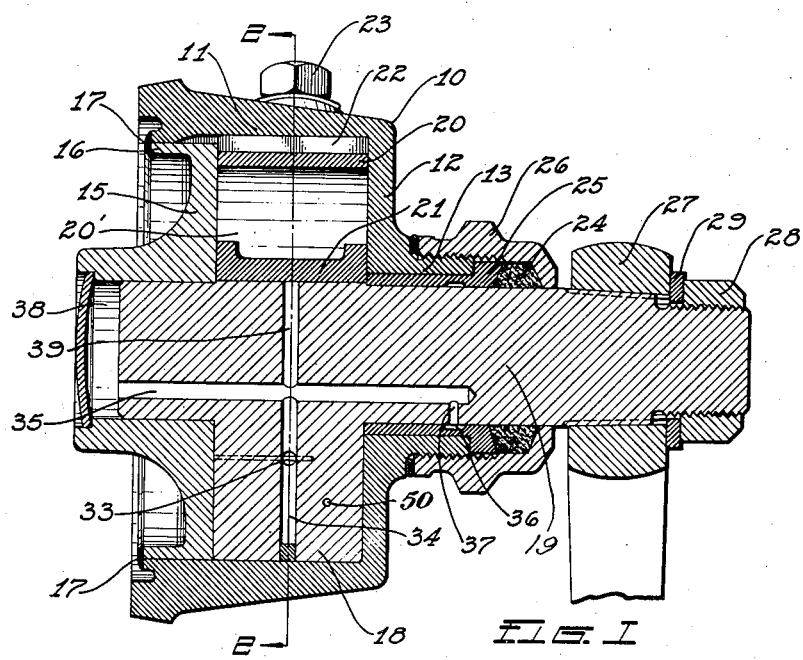
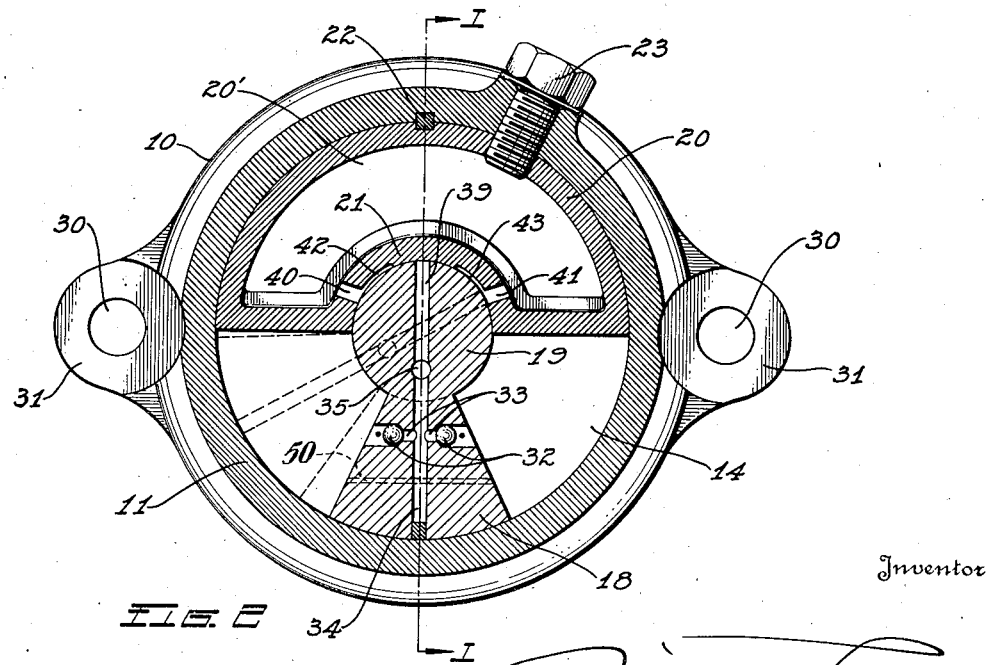
Inventor
Milton Tibbetts Patented Sept. 15, 1931

1,823,712

UNITED STATES PATENT OFFICE

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN

SHOCK ABSORBER

Application filed December 30, 1927. Serial No. 243,628.

This invention relates to motor vehicles and particularly to shock absorbers of the hydraulic type used on such vehicles between the frame and axle or between other relatively moving parts.

In shock absorbers of this type the liquid lost through leakage from the working chamber of the absorber is usually replaced from a supply contained in a replenishing reservoir or chamber in the absorber casing. The provision of such replenishing reservoir or chamber in the casing together with the necessary cooperating passages for conducting the liquid to the working chamber has considerably complicated the design and construction of the shock absorber. It is one of the objects of the present invention to simplify the construction of a hydraulic shock absorber particularly with respect to the replenishing reservoir or chamber.

Another object of the invention is to provide a hydraulic shock absorber with improved and simplified means for replacing the liquid lost through leakage from the working chamber of the absorber.

Another object of the invention is to provide a hydraulic shock absorber with a replenishing reservoir or chamber arranged above the working chamber and piston.

Other objects of the invention will appear from the following description taken in connection with the accompanying drawings forming a part of this specification, and in which:

Fig. 1 is a sectional view of a shock absorber embodying my invention, the section being substantially on line 1—1 of Fig. 2, and Fig. 2 is a section through the shock absorber taken substantially on line 2—2 of Fig. 1.

Referring to the drawings, 10 is the body or casing of the shock absorber having a cylindrical portion 11, an end wall 12 and a bearing portion 13. The cylindrical portion and end wall are machined internally to form a working chamber 14 for the shock absorber. A cover 15 fitted in the open end of the casing has an annular flange 16 and is secured to the casing by welding as at 17. A piston 18 mounted to oscillate in the working chamber 14 has a shaft 19 suitably supported in the casing and cover.

A substantially semi-cylindrical hollow member 20 having a bearing portion 21 for the shaft 19 is inserted into the cylindrical part of the casing between end wall 12 and cover 15 and forms with the end wall and cover of the casing, a replenishing reservoir or chamber 20' arranged above the working chamber 14 and the piston and shaft. Member 20 is held in position against movement around shaft 19 by any suitable means such as by key 22 engaging the cylindrical part of the casing. Member 20 must, of course, be mounted in position within the casing before cover 15 is inserted in place and welded to the casing. Both the working chamber and the replenishing reservoir are substantially filled with any suitable liquid such as oil or glycerine introduced through a filling opening provided in the casing and member 20 and closed by a plug 23. A packing 24 is compressed against bearing sleeve 25 by a hollow nut 26 screwed on the bearing portion 13 of the casing. Outwardly of nut 26, shaft 19 is serrated and an arm 27 is mounted upon the serrated portion and held thereon by nut 28 and washer 29.

The shock absorber is adapted to be mounted upon a support by suitable bolts extending through openings 30 in ears 31 provided on the absorber casing. Arm 27 is adapted for connection in any suitable manner to a part which moves relatively to the support upon which the shock absorber is mounted so that the piston will be operated in the working chamber as the vehicle parts move relatively to each other.

Piston 18 is provided with a pair of check valves 32 arranged in passages 33 which communicate with a passage 34 in the piston and which in turn connects with a passage 35 in shaft 19. An annular leakage groove 36 is formed in bearing sleeve 25 and a passage 37 connects this leakage groove with passage 35. Any liquid escaping from the working chamber in the direction of bearing sleeve 25 will be caught in the leakage groove 36 and drawn back into the working chamber through passages 37, 35, 34, 33 and past check valves 32 by reason of the suction existing on the low pressure or retreating side of the piston. Any liquid escaping to that end of shaft 19 in leak-bearing in cover 15 will accumulate in leakage space 38 between the end of the shaft and the cover and will be drawn back into the working chamber through passages 35, 34, 33 and past check valves 32.

In order that working chamber 14 may be replenished with liquid from replenishing chamber 20' when necessary, a passage 39 is provided in shaft 19 which extends from passage 35 to bearing portion 21 of member 20 preferably in line with passage 34 in the piston. Passage 39 is adapted to register, when piston 18 reaches its limit of travel in either direction, with one of two radial passages 40 and 41 extending through bearing portion 21 of the hollow member 20. But in order that replenishment of the working chamber may take place before the piston reaches its limit of travel, both passages 40 and 41 are extended toward the mid point of the bearing portion 21 by shallow passages 42 and 43.

Thus for small angular movements of the piston from its normal position shown in Fig. 2 of the drawing, passage 39 will not connect with passage 40 or 41 through the medium of shallow extensions 42 and 43 and as long as passage 39 oscillates between these shallow extensions 42 and 43 leakage liquid will be drawn into the working chamber 14 from leakage groove 36 and leakage space 38 by reason of the suction existing on the low pressure or retreating side of piston 18, but no replenishing liquid can reach the working chamber through passages 40 and 41. However, when piston 18 reaches a position such that passage 39 connects with shallow extension 42 or 43, a small quantity of replenishing liquid will flow into the working chamber through check valves 32 in the piston and when piston 18 is in its extreme limit of travel in either direction such as is shown in dotted lines in Fig. 2 of the drawing, the maximum amount of replenishing liquid will flow into the working chamber.

In this way return of leakage liquid to the working chamber is assured because leakage groove 36 and leakage space 38 are under constant suction for small movements of the piston in either direction while the replenishing chamber is positively cut off from the working chamber. It is only at a predetermined point in the movement of the piston in either direction that passage 39 will register with shallow extensions 42 and 43 and connect the replenishing and working chambers.

The piston 18 is provided with an open transversely extending passage 50, which is provided to establish communication between portions of the chamber 14 on opposite sides of the piston. It will be understood that, as the piston moves toward an abutment and compresses the liquid in the chamber, a certain amount of the liquid will flow through the passage 50 into the chamber on the suction side of the piston, so that the pressure is in this manner relieved. As the piston oscillates in either direction there will, therefore, be a flow of liquid from the compression side to the suction side of the chamber and in this manner the piston will be checked in its movement but will have a certain amount of movement in the chamber which will take up and absorb the shock of a sudden flexing of the vehicle springs.

With the replenishing chamber arranged above the working chamber and piston the action of gravity will supplement the suction existing on the retreating side of the piston for drawing replenishing liquid into the working chamber. Also the construction of the shock absorber particularly with respect to the replenishing reservoir or chamber and the passages associated therewith is considerably simplified. Hollow member 20 may be made of a casting and cover 15 may be made of a simple drop forging which is easily machined.

It will be understood that various forms of the invention other than those described may be used without departing from the spirit or scope of the invention.

Having thus described my invention, what I claim and desire to secure by Letters Patent is:

1. In a shock absorber, a casing, a working chamber in the casing, a piston having a shaft operable in the working chamber, a replenishing reservoir and a direct connection between the suction side of the working chamber and the replenishing reservoir through the piston and shaft while the piston is in certain positions of its movement.

2. In a shock absorber, a casing, a working chamber in the casing, a piston having a shaft operable in the working chamber, a member forming a housing for a replenishing reservoir and having a bearing portion for the shaft and a passage in said bearing portion adapted to communicate with a passage in the shaft and piston for connecting the suction side of the working chamber with the replenishing reservoir while the piston is in certain positions of its movement.

3. In a shock absorber, a casing, a working chamber in the casing, a piston having a shaft operable in the working chamber, a replenishing reservoir, a leakage groove, means connecting the leakage groove and the working chamber and means connecting the replenishing reservoir and the working chamber whereby upon relatively slight movement of the piston from its normal position, leakage liquid will be returned to the suction side of the working chamber and upon relatively greater movement of the piston from its normal position replenishing liquid will enter the suction side of the working chamber from the replenishing reservoir while the piston is in certain positions of its movement.

4. In a shock absorber, a casing, a working chamber in the casing, a piston having a shaft operable in the working chamber, a replenishing reservoir, a leakage groove, means connecting the leakage groove and the working chamber, a passage in the wall of the replenishing reservoir adapted to connect with the working chamber through a passage in the piston and shaft whereby upon relatively slight movement of the piston from its normal position, leakage liquid will be returned to the suction side of the working chamber and upon relatively greater movement of the piston from its normal position replenishing liquid will enter the suction side of the working chamber from the replenishing reservoir.

5. In a shock absorber, a casing, a working chamber in the casing, a piston having a shaft operable in the working chamber, a replenishing reservoir, a passage in the wall of the replenishing reservoir and a passage in the piston and shaft adapted to connect with the first named passage upon a predetermined movement of the piston from its normal position to allow replenishing of the liquid in the suction side of the working chamber.

6. In a shock absorber, a casing, a working chamber in the casing, a piston having a shaft operable in the working chamber, a replenishing reservoir, a pair of passages in the wall of the replenishing reservoir each having a shallow extension and a passage in the piston and shaft adapted to connect successively with the shallow extensions and the passages in the wall of the replenishing reservoir upon predetermined movements of the piston from its normal position to replenish liquid in the suction side of the working chamber.

7. In a shock absorber, a casing, a working chamber in the casing, a piston having a shaft operable in the working chamber, a replenishing reservoir, a passage in the wall of the replenishing reservoir and a passage in the piston and shaft adapted to connect with the first named passage and to thereby connect the replenishing reservoir and the suction side of the working chamber, said passages remaining unconnected until the piston reaches a predetermined compression position.

8. In a hydraulic shock absorber, a casing, a partition dividing said casing into a working chamber and a replenishing chamber, said partition having a pair of separated ports therethrough, a piston and shaft adapted to oscillate in said working chamber and to control the ports in said partition, said piston and shaft having duct means therein establishing the sole communication between the replenishing chamber and the working chamber on opposite sides of the piston, said piston having a pressure relief passage therethrough connecting the working chamber on opposite sides thereof.

9. In a hydraulic shock absorber, a casing, a partition dividing said casing into a working chamber and a replenishing chamber, and a piston adapted to oscillate in said working chamber, said piston providing the sole means of establishing communication between said replenishing chamber and the working chamber and between the portions of said working chamber on opposite sides thereof.

10. In a hydraulic shock absorber, a casing, a working chamber in the casing, a piston in the working chamber, a shaft having one end extending into the casing for operating the piston, and a leakage chamber in said casing adjacent the end of said shaft, said shaft and piston having a by-pass therein for connecting the leakage chamber with the working chamber on the suction side of the piston during operation thereof.

11. In a hydraulic shock absorber, a casing, a working chamber in the casing, a piston in the working chamber, a shaft having an end extending into the casing for operating the piston, a leakage chamber in the casing adjacent the end of said shaft, and duct means for connecting the leakage chamber with the working chamber on the suction side of the piston.

12. In a hydraulic shock absorber, a casing, a cover secured to said casing, said cover having a shaft bearing portion, a working chamber in the casing, a piston in the working chamber, a shaft extending into said casing for operating said piston, one end of said shaft being supported in the bearing portion of the cover, the end of said shaft in said bearing and the bearing forming a leakage chamber, and by-pass means connecting the leakage chamber with the suction side of the working chamber during operation of the piston.

13. In a hydraulic shock absorber, a casing, a working chamber in the casing, a piston in the working chamber, a shaft extending into said casing transversely of the working chamber for operating the piston, means adjacent said shaft on both sides of the working chamber for collecting liquid leakage, and duct means for establishing communication between the suction side of the working chamber and said means during operation of the piston.

14. In a hydraulic shock absorber, a casing, a working chamber in the casing, a piston in the working chamber, a shaft extending into said casing for operating the piston, and a pair of spaced leakage collecting means in said casing, said shaft and piston having ducts therein for establishing communication between both of said leakage collecting means and the suction side of the working chamber during operation of the piston.

15. In a hydraulic shock absorber, a casing, a working chamber, a replenishing reservoir for the working chamber, a piston in the working chamber, a shaft extending into the casing for operating the piston, and a leakage chamber adjacent the end of the shaft in the casing, said piston and shaft having duct means therein for establishing communication from both the reservoir and the leakage chamber to the suction side of the working chamber.

16. In a hydraulic shock absorber, a casing, a working chamber, a replenishing reservoir for the working chamber, a piston in the working chamber, a shaft extending into the casing for operating said piston, and means adjacent said shaft for collecting liquid leakage, the movement of said shaft and piston establishing communication of the reservoir and the leakage collecting means with the suction side of the working chamber.

17. In a hydraulic shock absorber, a casing, a working chamber, a replenishing reservoir for the working chamber, a piston in the working chamber, a shaft extending into the casing for operating the piston, and means adjacent said shaft for collecting liquid leakage, said piston and shaft being provided with duct means for establishing continuous communication between the collecting means and the suction side of the working chamber during any stroke thereof and between the reservoir and suction side of the working chamber during only a portion of the stroke thereof.

18. In a hydraulic shock absorber, a casing, a working chamber, a replenishing reservoir for the working chamber, a piston in the working chamber, a shaft extending into the casing for operating the piston, and spaced means adjacent said shaft for collecting liquid leakage, said piston and shaft being provided with duct means for establishing continuous communication between both said collecting means and the suction side of the working chamber during any stroke thereof and between the reservoir and the suction side of the working chamber during only a portion of the stroke thereof.

In testimony whereof I affix my signature.

MILTON TIBBETTS.